United States Patent
Ito et al.

(10) Patent No.: US 7,560,915 B2
(45) Date of Patent: Jul. 14, 2009

(54) POWER SUPPLY APPARATUS PROVIDED WITH REGULATION FUNCTION AND BOOSTING OF A REGULATED VOLTAGE

(75) Inventors: Tomoyuki Ito, Kyoto (JP); Isao Yamamoto, Kyoto (JP)

(73) Assignee: Rohm Co., Ltd. (JP)

( * ) Notice: Subject to any disclaimer, the term of this patent is extended or adjusted under 35 U.S.C. 154(b) by 375 days.

(21) Appl. No.: 11/131,860

(22) Filed: May 18, 2005

(65) Prior Publication Data
US 2005/0258891 A1 Nov. 24, 2005

(30) Foreign Application Priority Data
May 21, 2004 (JP) ............................. 2004-152071
Apr. 28, 2005 (JP) ............................. 2005-133340

(51) Int. Cl.
*G05F 1/00* (2006.01)
(52) U.S. Cl. ..................... 323/282; 323/266; 323/274; 323/284; 323/351
(58) Field of Classification Search ................. 323/211, 323/266, 282, 283, 285, 284, 351, 273, 274
See application file for complete search history.

(56) References Cited
U.S. PATENT DOCUMENTS

| | | | |
|---|---|---|---|
| 5,936,914 A * | 8/1999 | Yamaguchi et al. | 368/205 |
| 6,185,082 B1 * | 2/2001 | Yang | 361/90 |
| 6,262,567 B1 * | 7/2001 | Bartlett | 323/303 |
| 2002/0093318 A1 * | 7/2002 | Wallis | 323/274 |
| 2002/0140410 A1 * | 10/2002 | Rothleitner et al. | 323/282 |
| 2005/0234572 A1 * | 10/2005 | Heubi et al. | 700/94 |

FOREIGN PATENT DOCUMENTS

| | | |
|---|---|---|
| JP | 2002-10642 | 1/2001 |
| JP | 2002-369501 | 12/2002 |
| JP | 2003-153530 | 5/2003 |
| JP | 2003-339156 | 11/2003 |

OTHER PUBLICATIONS

Chinese Office Action for Chinese Patent Application No. 200510068844.0 issued Jun. 27, 2008 with English Translation.

* cited by examiner

*Primary Examiner*—Akm E Ullah
*Assistant Examiner*—Arun Williams
(74) *Attorney, Agent, or Firm*—Cantor Colburn LLP (57) ABSTRACT

A voltage comparator of a power supply apparatus detects overshoot by comparing an output voltage with a threshold voltage. The power supply apparatus is provided with three switches. Upon detection of overshoot, the boosting operation of a booster circuit is suspended and the first through third switches are turned on. While the boosting operation is being suspended, the second switch operates to lower the output voltage. Concurrently, the first and third switches operate to forcibly lower an input voltage to allow the output voltage, occurring after the boosting operation is resumed, to approach a preset voltage.

8 Claims, 5 Drawing Sheets

POWER SUPPLY APPARATUS PROVIDED WITH REGULATION FUNCTION AND BOOSTING OF A REGULATED VOLTAGE

BACKGROUND OF THE INVENTION

1. Field of the Invention

The present invention relates to a power supply apparatus provided with a regulation function for stabilizing an output voltage.

2. Description of the Related Art

Small-sized information terminals such as a cell phone and a personal digital assistant (PDA) incorporate a device, such as a light emitting diode used as backlight for a liquid crystal display, which requires a voltage higher than an output voltage of a battery. For example, Li-ion batteries are often used in these small-sized information terminals. The output voltage of a Li-ion battery is usually about 3.5V and, even when fully charged, is about 4.2V. Meanwhile, an LED requires a voltage of about 4.5V for driving. When a voltage higher than a battery voltage is required, a power supply apparatus using a booster circuit of a charge pump type is employed to boost the battery voltage and output a voltage necessary to drive the LED.

In the power supply apparatus provided with the booster circuit, overshoot defined as a transient change in an output voltage to a greater value occurs at start-up or upon occurrence of a significant load change. An overshoot may sometimes adversely affect the reliability of a device such as an LED connected as a load to the power supply apparatus.

In the related art, soft start, in which an output voltage is slowly brought to a desired level at start-up, has been known as a means to prevent overshoot (see patent documents No. 1 and No. 2).

[Patent Document No. 1]
JP 2002-369501 A

[Patent Document No. 2]
JP 2003-339156 A

Some power supply apparatuses provided with a booster circuit are configured such that the charge pump gain of the booster circuit is made to vary so that a constant voltage is obtained even when a battery voltage, an input voltage, drops. In the booster circuit built in the apparatus of this type, an overshoot beyond a preset output voltage temporarily occurs not only at start-up but also when the charge pump gain is switched. Given that the voltage input to the booster circuit is 3V, an overshoot of the output voltage to 6V may occur when the charge pump gain is switched from 1.0 to 2.0.

SUMMARY OF THE INVENTION

The present invention has been done in view of the aforementioned problem and its object is to provide a power supply apparatus which is provided with the function of preventing overshoot that may affect the reliability of a driven device and in which the stability of output voltage is improved.

The present invention according to one aspect provides a power supply apparatus comprising: a booster circuit which boots an input voltage at a preset gain; a regulator which regulates the input voltage to the booster circuit by feedback so that an output voltage of the booster circuit is equal to a preset voltage; a voltage comparator which compares the output voltage with a predetermined threshold voltage and outputs a boost suspension signal when the output voltage is higher than the threshold voltage; and a first auxiliary circuit which forcibly lowers the input voltage to the booster circuit in response to the boost suspension signal. The voltage comparator detects overshoot and turns on the auxiliary circuit when the output voltage exceeds the threshold voltage. According to this aspect, the regulator regulates the output to the preset voltage. The first auxiliary circuit forcibly lowers the input voltage of the booster circuit instantaneously. With this, overshoot in which the output voltage goes far beyond the threshold voltage is prevented so that the output voltage is made to converge to the preset voltage in a short period of time.

The first auxiliary circuit may comprise a first switch which is provided between the input terminal of the booster circuit and the ground and which is turned on in response to the boost suspension signal. By turning the switch element on, the capacitor provided at the input of the booster circuit is discharged so that the input voltage of the booster circuit is forcibly lowered.

The power supply apparatus may further comprise means which suspends the boosting operation of the booster circuit in response to the boost suspension signal. In this case, the output voltage is prevented from exceeding the threshold voltage by suspending the boosting operation and, concurrently, the first auxiliary circuit forcibly lowers the input voltage of the booster circuit. As a result, the output voltage occurring when the boosting is resumed is lowered and the output voltage is made to approach the preset voltage rapidly in a post-resumption period.

The power supply apparatus may further comprise a second auxiliary circuit which forcibly lowers the output voltage of the booster circuit in response to the boost suspension signal. In the even of overshoot beyond the threshold voltage, the second auxiliary circuit, which is provided besides the load circuit connected to the output of the booster circuit, is turned on so as to provide a bypass route for a current. In this way, abrupt voltage rise in overshoot is mitigated.

The power supply apparatus may further comprise a current limiter circuit which limits the supply of current from the regulator to the booster circuit. By suspending the supply of current from the regulator to the booster circuit that may cause an increase in the input voltage of the booster circuit, the lowering of the input voltage is facilitated so that overshoot is prevented.

The present invention according to another aspect also provides a power supply apparatus. The power supply apparatus according to this aspect comprises: a booster circuit which boosts an input voltage at a preset gain; a regulator which regulates the input voltage to the booster circuit by feedback so that an output voltage of the booster circuit is equal to a preset voltage; a voltage comparator which compares the output voltage with a predetermined threshold voltage and outputs a boost suspension signal when the output voltage is higher than the threshold voltage; and means which suspends a boosting operation of the booster circuit in response to the boost suspension signal. According to this aspect, the boosting operation itself is suspended in the event of an overshoot beyond the threshold voltage. With this, the output voltage is prevented from exceeding the threshold voltage without the input voltage to the booster circuit being lowered.

The present invention according to still another aspect also provides a power supply apparatus. The power supply apparatus according to this aspect comprises: a booster circuit which boosts an input voltage at a preset gain; a regulator which regulates the input voltage to the booster circuit by feedback so that an output voltage of the booster circuit is equal to a preset voltage; a voltage comparator which compares the output voltage with a predetermined threshold voltage and outputs a boost suspension signal when the output voltage is higher than the threshold voltage; and a second auxiliary circuit which forcibly lowers the output voltage of the booster circuit in response to the boost suspension signal. The second auxiliary circuit may comprise a second switch element which is provided between an output terminal of the booster circuit and the ground and which is turned on in response to the boost suspension signal.

According to this aspect, in the event of an overshoot beyond the threshold voltage, the second auxiliary circuit which is provided besides the load circuit connected to the output of the booster circuit, is turned on so as to provide a bypass route for a current. In this way, abrupt voltage rise in overshoot is mitigated.

The present invention according to yet another aspect also provides a power supply apparatus. The power supply apparatus according to this aspect comprises: a booster circuit which boosts an input voltage at a preset gain; a regulator which regulates the input voltage to the booster circuit by feedback so that an output voltage of the booster circuit is equal to a preset voltage; a voltage comparator which compares the output voltage with a predetermined threshold voltage and outputs a boost suspension signal when the output voltage is higher than the threshold voltage; and a current limiter circuit which limits the supply of current from the regulator to the booster circuit in response to the boost suspension signal. According to this aspect, by suspending the supply of current from the regulator to the booster circuit that may cause an increase in the input voltage of the booster circuit, the lowering of the input voltage is facilitated so that overshoot is prevented.

The regulator may comprise: an error amplifier which amplifiers an error between the output voltage of the booster circuit and the preset voltage; and a transistor having its conduction level controlled by an output from the error amplifier, and wherein the current limiter circuit comprises a switch element provided between a control terminal of the transistor and a fixed voltage. By enforcing a change in the voltage at the control terminal of the transistor using the switch element, the transistor is turned on so that a path for current supply is cut off.

The present invention according to another aspect also provides a power supply apparatus. The power supply apparatus according to this aspect comprises: a booster circuit which boosts an input voltage at a preset gain; a regulator which regulates the input voltage to the booster circuit by feedback so that an output voltage of the booster circuit is equal to a preset voltage; and an auxiliary circuit which regulates the input voltage at a response speed higher than the regulation of the input voltage by the regulator. Normally, the response speed of the regulator is not fast enough to catch up with the voltage waveform occurring at start-up or when the gain is switched. This is addressed by providing an auxiliary circuit which is capable of regulating the input voltage of the booster circuit at a faster rate but is not designed to regulate the output voltage at any target values, unlike the regulator. The auxiliary circuit is turned on or off, depending on whether a certain threshold value is reached. According to this aspect, overshoot beyond the threshold voltage is prevented. Moreover, the output voltage is stabilized to a preset voltage in a shorter period of time than the convergence time required when the regulator is used alone.

The present invention according to still another aspect provides an electronic appliance. The electronic appliance according to this aspect comprises: a light-emitting element; and the power supply apparatus as described above which supplies a voltage to drive the light-emitting element. According to this aspect, the light-emitting element is prevented from being applied an excessively high voltage.

It is to be noted that any arbitrary combination or rearrangement of the above-described structural components and so forth are all effective as and encompassed by the present embodiments.

Moreover, this summary of the invention does not necessarily describe all necessary features so that the invention may also be sub-combination of these described features.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Figure 1:
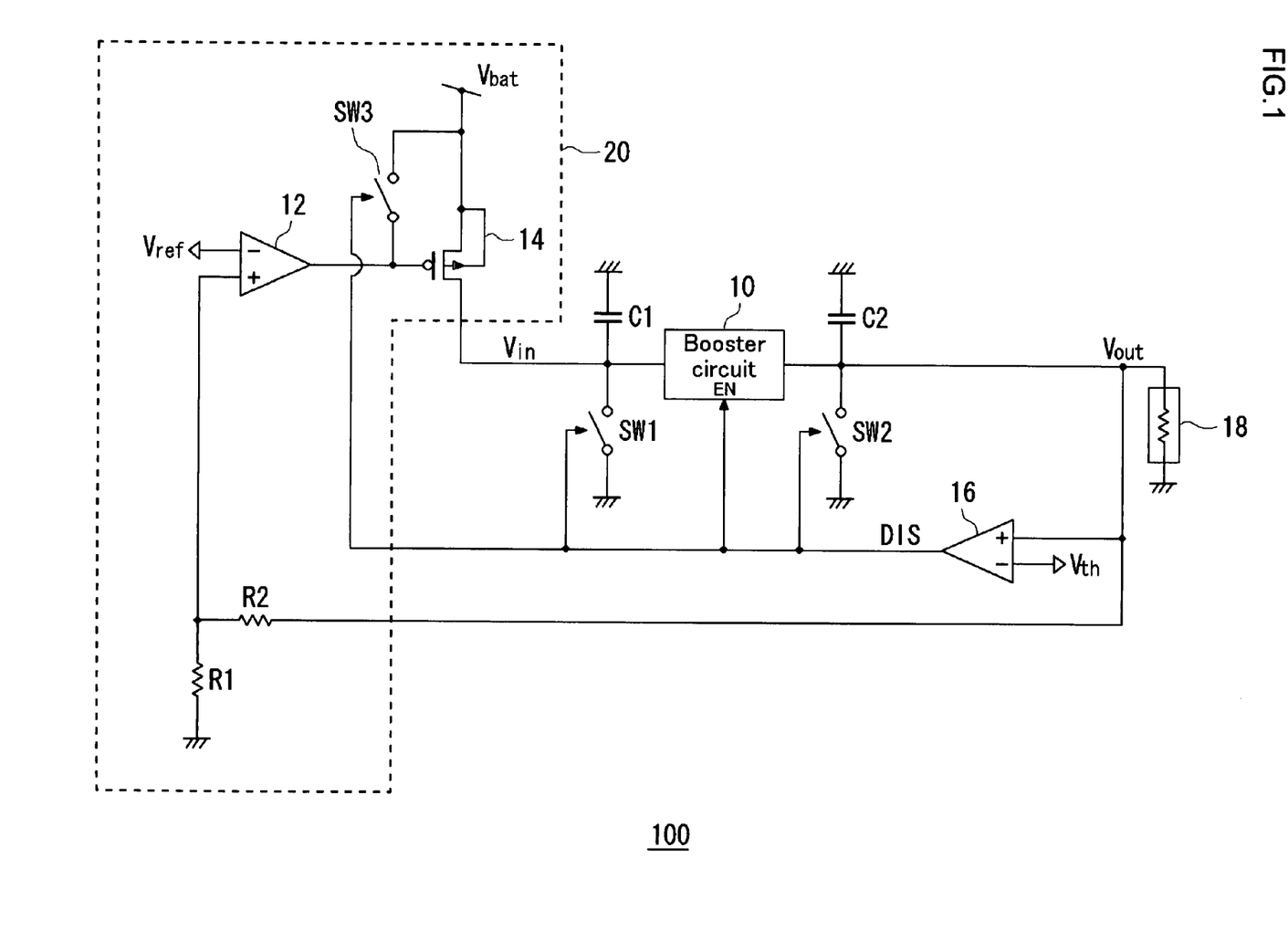
FIG. 1 is a circuit diagram illustrating a power supply apparatus according to an embodiment of the present invention.

FIG. 1 is a circuit diagram illustrating a power supply apparatus according to an embodiment of the present invention. The power supply apparatus is built, for example, in an electronic appliance such as a cell phone and a PDA and boosts a voltage output from a battery so as to generate a voltage to drive an LED used as backlight for an LCD.

Figure 5:
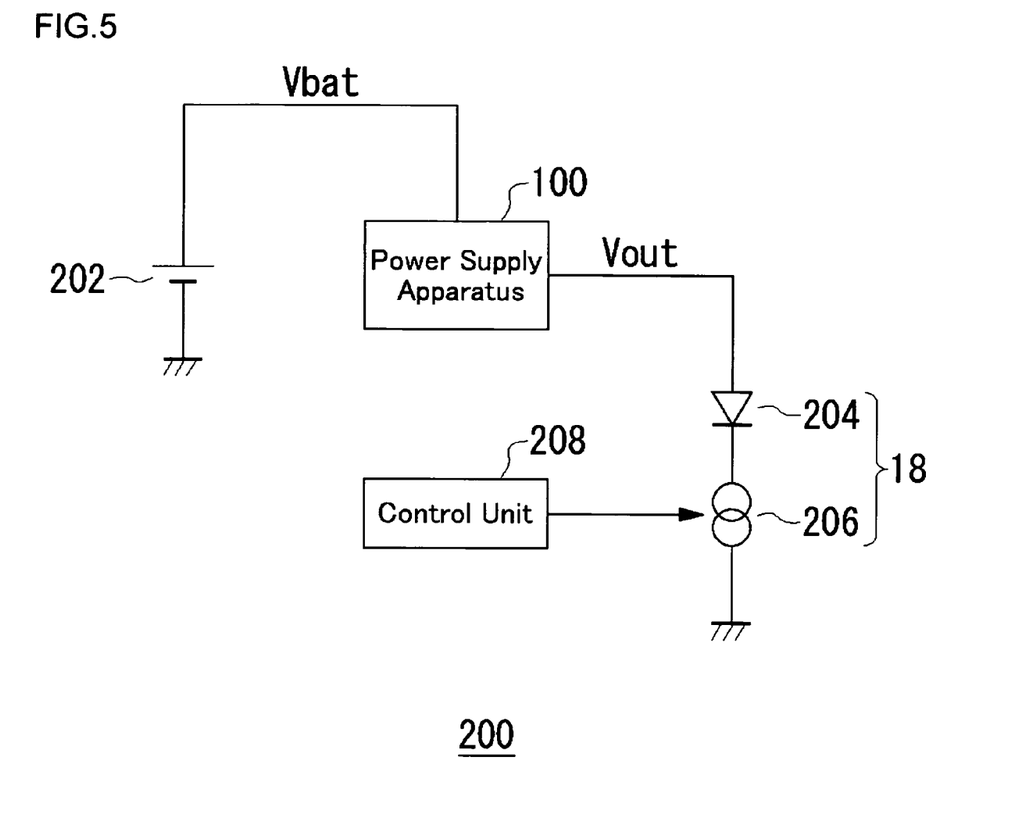
FIG. 5 is a block diagram illustrating the structure of an electronic appliance in which the power supply apparatus of FIG. 1 is built.

FIG. 5 is a block diagram illustrating the structure of an electronic appliance 200 in which the power supply apparatus of FIG. 1 is built. The electronic appliance 200 comprises a power supply apparatus 100, a battery 202, an LED 204, a constant-current circuit 206 and a control unit 208.

The battery 202 outputs a battery voltage Vbat. The power supply apparatus 100 boosts the battery voltage Vbat and outputs a drive voltage Vout to the anode of the LED 204. The constant-current circuit 206 is provided between the cathode of the LED 24 and the ground so as to generate a constant current that flows in the LED 204 and cause the LED 204 to emit light with predetermined luminance. The LED 204 and the constant-current circuit 206 correspond to a load circuit 18. The control unit 208 is a block for integrally controlling the electronic appliance 200 as a whole. The constant-current circuit 206 generates a constant current by referring to a current value designated by the control unit 208 and controls the luminance of the LED 204.

Referring back to FIG. 1, a power supply apparatus 100 according to the embodiment comprises a voltage comparator 16 for detecting overshoot of an output voltage and first through third switches SW1-SW3 which are auxiliary circuits for immediately suppressing the detected overshoot, in addition to a booster circuit of, for example, a charge pump type and a regulator 20 for receiving an output voltage fed back from the booster circuit 10 and regulating an input voltage accordingly. The power supply apparatus 100 is formed as an integrated semiconductor circuit except for input and output capacitors C1 and C2 and a load circuit 18. Alternatively, the input capacitor C1 and C2 may also be integrated, depending on the semiconductor fabrication process and capacitance used.

The booster circuit 10 outputs a voltage obtained by multiplying an input voltage Vin by a predetermined gain. An output voltage Vout directly represents an output of the power supply apparatus 100. In order to continue to output a preset voltage Vset even when a battery voltage Vbat drops, the booster circuit 10 is operated by switching between different gains. The booster circuit 10 is also provided with an enable terminal EN so that the boosting operation is suspended by an external signal. The enable terminal is fed an active-low signal. More specifically, the boosting is performed while a low level is input to the terminal and the boosting operation is suspended while a high level is input. In a case in which the charge pump circuit is used as the booster circuit, suspension of operation is achieved by, for example, suspending the oscillation of an internal oscillator. An input terminal and an output terminal of the booster circuit 10 are grounded via an input capacitor C1 and an output capacitor C2, respectively, for smoothing.

Figure 2:
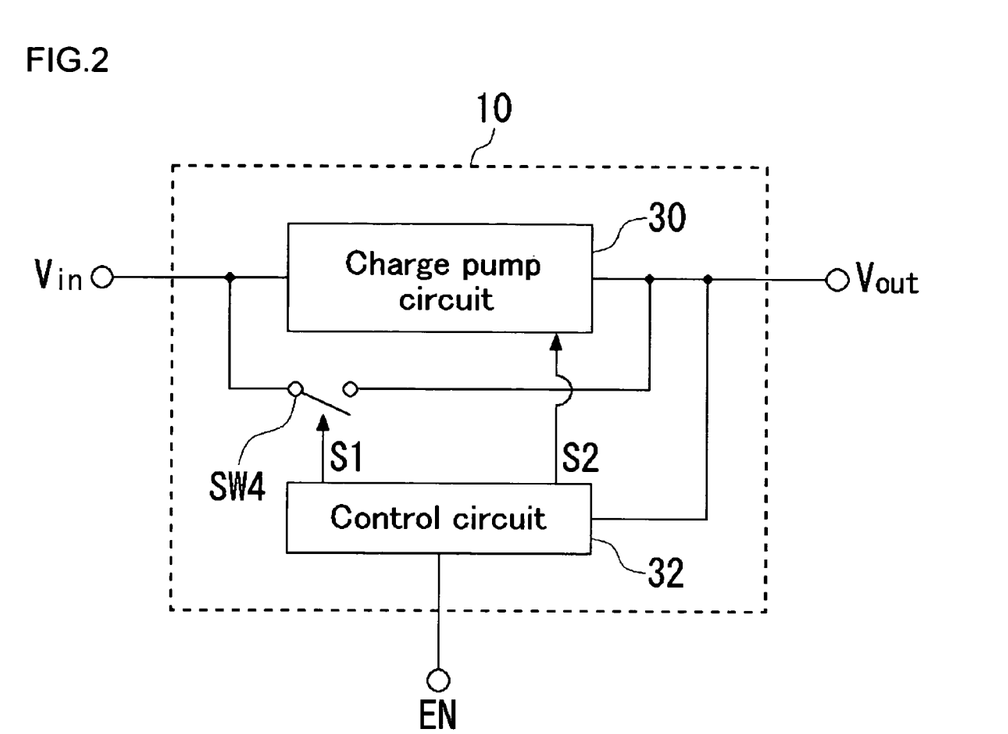
FIG. 2 is a block diagram illustrating the structure of a booster circuit used in the power supply apparatus of the embodiment, capable of switching the gain.

The requirement for the booster circuit 10 is that it is operated by switching between different gains, which are arbitrary. According to this embodiment, it will be assumed that the circuit is operated by switching between the gain of 1.0 and the gain of 2.0, for brevity. FIG. 2 is a block diagram illustrating the structure of a booster circuit used in the power supply apparatus of the embodiment, capable of switching the gain. As illustrated in FIG. 2, the booster circuit 10 is provided with a charge pump circuit 30 with the gain of 2.0, a control circuit 32 and a bypass switch SW4. A boost suspension signal DIS is input from the voltage comparator 16 to the enable terminal EN of the booster circuit 10 and is directly input to the control circuit 32. The control circuit 32 outputs a first control signal S1 for on-off control of the bypass switch SW4 and a second control signal S2 for control of the gain of the charge pump circuit 30 and for boost suspension. The first control signal S1 and the second control signal S2 are input to the bypass switch SW4 and the charge pump circuit 30, respectively.

The control circuit 32 controls the booster circuit 10 as described below. The control circuit 32 controls the suspension of boosting operation of the charge pump circuit 30 by using the boost suspension signal DIS at a low level or a high level. The control circuit 32 also determines the gain by referring to the relation between the output voltage Vout and the preset voltage Vset and controls the switching of the charge pump circuit 30 accordingly. More specifically, when the output voltage Vout is equal to the preset voltage Vset, the gain is controlled to be 1.0. When the output voltage Vout is lower than a predetermined voltage lower than the preset voltage Vset, the gain is controlled to be 2.0.

The booster circuit 10 assumes one of the three following states depending on the output voltage Vout and the boost suspension signal DIS input to the enable terminal EN.

In a first state, the boost suspension signal DIS at a high level is input. In this state, the control circuit 32 disconnects between the input terminal and the output terminal by turning the bypass switch SW4 off by the first control signal S1 and suspends the boosting operation of the charge pump circuit 30 by the second control signal S2. As a result, the booster circuit 10 is placed in an off state in which the output voltage Vout does not depend on the input voltage Vin.

In a second state, the boost suspension signal DIS at a low level is input and the control circuit 32 designated the gain of 1.0. In this state, the control circuit 32 turns the bypass switch SW4 on by the first control signal S1 and suspends the boosting operation of the charge pump circuit 30 by the second control signal S2. As a result, the input terminal and the output terminal of the charge pump circuit 30 are short-circuited so that Vin=Vout holds, i.e. the gain of 1.0 is achieved.

In a third state, the boost suspension signal DIS at a low level is input and the control circuit 32 designates the gain of 2.0. In this state, the bypass switch SW4 is turned off by the first control signal S1 and the gain of 2.0 is achieved by allowing the charge pump circuit 30 to perform the normal boosting operation by the second control signal S2.

Thus, the booster circuit 10 is configured to operate in different modes depending on the output voltage Vout and the boost suspension signal DIS.

Referring back to FIG. 1, the output voltage Vout of the booster circuit 10 is supplied to the load circuit 18 and is also input to the regulator 20 for stabilizing the output voltage Vout by a feedback operation. The regulator 20 is provided with feedback resistors R1 and R2, an operational amplifier 12 and a P-channel metal oxide semiconductor field effect transistor (MOSFET) 14. A reference voltage Vref is input to the inverting input of the operational amplifier 12 and a voltage obtained by dividing the output voltage Vout by feedback resistors R1 and R2 at a ratio R1/(R1+R2) is input to the non-inverting input. An output of the operational amplifier 12 is connected to the gate (control terminal) of the MOSFET 14. The battery voltage Vbat is connected to the source terminal of the MOSFET 14. The drain terminal of the MOSFET 14 is connected to the input terminal of the booster circuit 10 as an output of the regulator 20.

The preset voltage Vset is given by Vset=(R1+R2)/R1× Vref, where Vref denotes a reference voltage. Feedback control is applied to the drain voltage of the MOSFET 14, i.e. the input voltage Vin of the booster circuit 10 so that an error between the preset voltage Vset and the output voltage Vout is minimum.

The voltage comparator 16 is provided to detect overshoot. A threshold voltage Vth is input to the negative input terminal of the voltage comparator 16. The output voltage Vout of the booster circuit 10 is input to the positive input terminal. The threshold voltage Vth is defined to be higher than the preset voltage Vset and lower than a voltage that may affect the reliability of the device used in the load circuit 18.

When the voltage comparator 16 finds that the output voltage Vout is higher than the threshold voltage Vth, i.e., when it detects an excessive overshoot, the voltage comparator 16 brings the boost suspension signal DIS to a high level. Of course, the input to the positive input terminal of the voltage comparator 16 needs not to be the output voltage Vout itself. The output voltage Vout may be lowered by a certain ratio using resistor division before being input to the voltage comparator 16. Also, the threshold voltage Vth may be lowered by the same ratio before being input to the negative input.

The boost suspension signal DIS output from the voltage comparator 16 is input to the enable terminal EN of the booster circuit 10 and the first through third switches SW1-SW3. The first switch SW1 is provided between the input voltage Vin of the booster circuit 10 and the ground potential. In an on state, the first switch SW1 discharges the input capacitor C1. That is, the first switch SW1 operates as an auxiliary circuit for forcibly lowers the input voltage. The second switch SW2 is provided between the output voltage Vout of the booster circuit 10 and the ground potential. In an on state, the second switch SW2 discharges the output capacitor C2. That is, the second switch SW2 operates as an auxiliary circuit for forcibly lowering the output voltage Vout of the booster circuit 10. The third switch SW3 is provided between the gate and source of the MOSFET 14 used in the regulator 20. When turned on, the third switch SW3 operates to establish a short circuit between the gate and source of the MOSFET 14 and cut off a current input to the booster circuit 10. For example, these switches may be formed using MOSFETs. In this case, the boost suspension signal DIS may be input to the gate terminal of the MOSFET so as to control the gate-source voltage. On and off of the MOSFET cause the resistance between the drain and source to vary, enabling the MOSFET to be used as a switch.

A description will now be given of the operation of the power supply apparatus 100 and, more particularly, of a case where the gain of the booster circuit 10 is switched at a certain point of time. As described before, the booster circuit 10 is controlled by the control circuit 32 inside to automatically switch the gain to an appropriate value adapted to the output voltage Vout.

Figure 3:
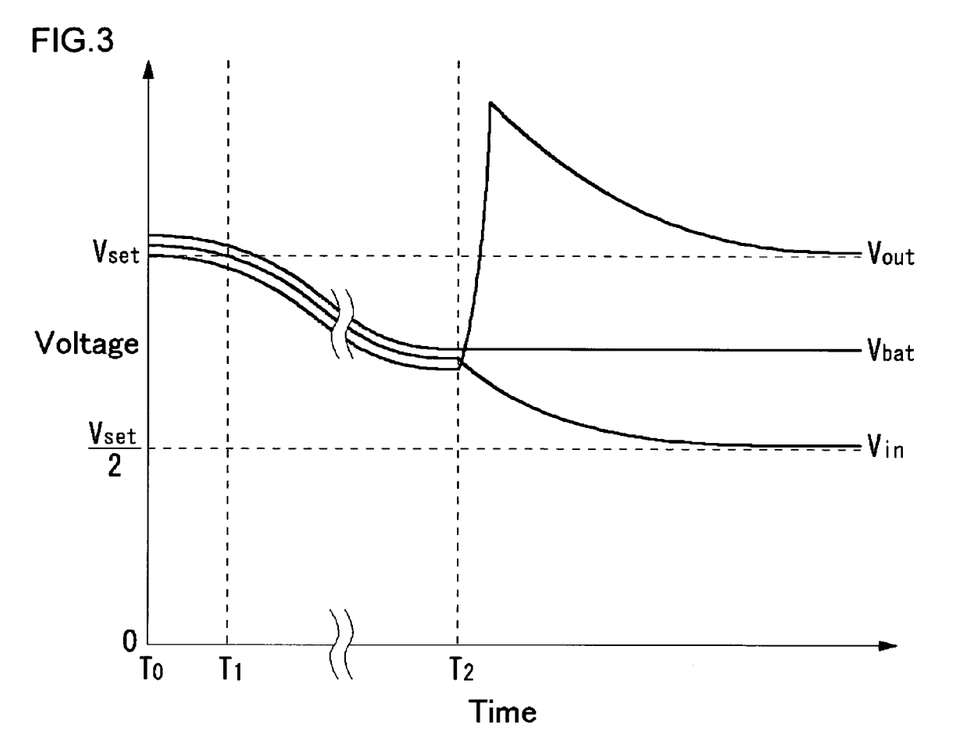
FIG. 3 is a chart illustrating time waveforms of a battery voltage, an output voltage and an input voltage to explain overshoot occurring when the gain is switched.

In order to let the operation of the overshoot prevention function according to this embodiment be further appreciated, a description will now be given, with reference to FIG. 3, of the operation performed when the voltage comparator 16 is not operated, i.e., when overshoot is not detected. FIG. 3 is a chart illustrating time waveforms of a battery voltage, an output voltage and an input voltage to explain overshoot occurring when the gain is switched.

At an interval between T0 and T1, the battery voltage Vbat is higher than the preset voltage Vset set up for the output voltage. Therefore, the output voltage Vout can be stabilized at the preset voltage Vset with the gain of 1.0. When the battery voltage Vbat drops due to prolonged use, the input voltage Vin of the booster circuit 10 drops accordingly. Therefore, given that the gain of the booster circuit 10 remains constant, the output voltage Vout drops in association with the drop in the battery voltage, making it impossible to maintain the preset voltage Vset. The situation described above is represented in the chart as an interval between T1 and T2 of FIG. 3.

At time T2, when the output voltage Vout drops below a predetermined value, the control circuit 32 switches the gain from 1.0 to 2.0 so as to match the output voltage Vout with the preset voltage Vset. At the moment of switching, the booster circuit 10 operates to output a voltage twice the input voltage Vin. This generates overshoot in which the output voltage Vout is momentarily brought to a high level. Subsequently, the input voltage Vin gradually drops through the feedback operation of the regulator 20, causing the output voltage Vout to gradually converge to the preset voltage Vset. Thus, overshoot occurring when the gain is switched cannot be prevented completely, merely by the feedback operation of the regulator 20. A prolonged period of time is required before the circuit settles to a normal state.

Figure 4:
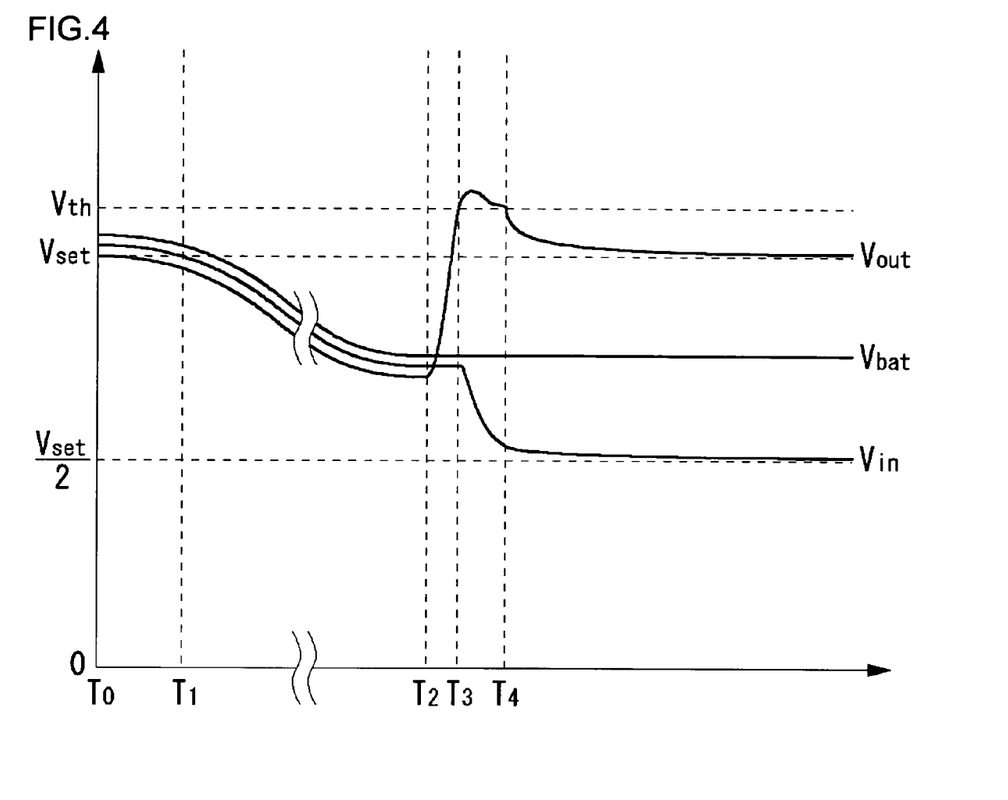
FIG. 4 is a chart illustrating time waveforms of a battery voltage, an output voltage and an input voltage of the power supply apparatus of the embodiment when the gain is switched.

A description will now be given, with reference to FIG. 4, of the operation of the power supply apparatus 100 according to this embodiment involving the operation of the voltage comparator 16 for detecting overshoot. FIG. 4 is a chart illustrating time waveforms of a battery voltage, an output voltage and an input voltage of the power supply apparatus of the embodiment when the gain is switched. In a period between T1 and T2, the operation of the apparatus remains unchanged from the above-described operation where overshoot is not detected. In this period, the output voltage Vout is lower than the threshold voltage Vth. Therefore, the voltage comparator 16 outputs the boost suspension signal DIS at a low level so that the switches SW1-SW3 are turned off.

At time T2, when the gain is switched from 1.0 to 2.0, the booster circuit 10 operates to output a voltage twice the input voltage Vin occurring at the time of switching. Thereby, the output voltage Vout begins to increase. At time T3, when the output voltage Vout is brought to a level of the threshold voltage Vth, the voltage comparator 16 detects this and changes the boost suspension signal DIS, the output from the voltage comparator 16, to a high level. When the boost suspension signal DIS is brought to a high level, the boosting operation of the booster circuit 10 is suspended and the switches SW1-SW3 are turned on.

When the boosting operation of the booster circuit 10 is suspended at time T3, the output voltage Vout overshoots to a certain voltage and then gradually drops due to the discharge of the output capacitor C2, irrespective of the input voltage Vin. Normally, the discharge path of the output capacitor C2 is the load circuit 18. By turning on the second switch SW2 on by the boost suspension signal DIS, the discharge also takes place via the second switch SW2. As a result, the output voltage Vout is lowered more rapidly than when the discharge takes place only via the load circuit 18.

In a period between T3 and T4, the following operation is performed in relation to the input voltage Vin of the booster circuit 10. When the boosting operation of the booster circuit 10 is suspended, the charge supplied from the regulator 20 and built up in the input capacitor C1 loses its discharge path. Therefore, the input voltage Vin is not lowered even when the regulator 20 applies feedback to lower the input voltage Vin of the booster circuit 10. Accordingly, by turning the first switch SW1 on at time T3, a new discharge path from the input terminal of the booster circuit 10 to the ground is provided. The charge built up in the input capacitor C1 is discharged via this discharge path so that the input voltage Vin of the booster circuit 10 is forcibly lowered.

When the third switch SW3 is turned on, a short circuit is established between the gate and source of the MOSFET 14 of the regulator 20, causing the MOSFET 14 to be turned off and the supply of current to the booster circuit 10 to be suspended. This is equivalent to the suspension of charging of the input capacitor C1 and indirectly helps the input voltage Vin of the booster circuit 10 to be lowered. The current supplied from the regulator 20 in this interval is eventually wasted by being discharged via the first switch SW1. It is also for this reason that the current supplied from the regulator 20 be preferably cut off. Thus, the first switch SW1 and the third switch SW3 operate in combination with each other to serve as auxiliary circuits for lowering the input voltage Vin. Since the auxiliary circuits take advantage of discharge via the switches, it is possible to change the voltage more rapidly than regulation of the input voltage Vin by the regulator 20 constituting a feedback loop using the operational amplifier 12.

Directing our attention again to the output terminal of the booster circuit 10, the boosting operation itself of the booster circuit 10 is suspended in a period of time while the boost suspension signal DIS is at a high level. Therefore, the output voltage Vout drops as a result of discharge via the load circuit 18 and the third switch SW3. Subsequently, at time T4, when the output voltage Vout drops to the threshold voltage Vth, the boost suspension signal DIS is brought to a low level.

At time T4, the input voltage Vin is sufficiently lowered by the first switch SW1 and the third switch SW3 as two auxiliary circuits. The speed of discharge by the first switch SW1 for lowering the input voltage Vin is designed such that the input voltage Vin drops to ½ of the preset voltage Vset set up for the output voltage in a period started when the output voltage Vout temporarily exceeds the threshold voltage Vth and ended when the output voltage Vout drops below the threshold voltage Vth again, i.e., in a period between T3 and T4.

When the output suspension signal DIS is brought to a low level at time T4, the first through third switches SW1-SW3 are turned off again so that the boosting operation of the booster circuit 10 is resumed. When the boosting operation is resumed, the booster circuit 10 outputs a voltage obtained by boosting the input voltage Vin by the gain of 2.0. Accordingly, if the input voltage Vin of the booster circuit 10 had dropped to a level approximately ½ of the preset voltage Vset, the output voltage of a value close to the preset voltage Vset is output from the booster circuit 10. Thereafter, overshoot beyond the threshold voltage Vth does not occur and the boost suspension signal DIS is not brought to a high level. Accordingly, the output voltage Vout converges to the preset voltage Vset as a result of the regulator 20 regulating the input voltage Vin of the booster circuit 10.

Thus, according to the power supply apparatus of this embodiment, the detection of overshoot beyond prompts the suspension of the boosting operation of the booster circuit 10, forcibly lowers the output voltage Vout and also lowers the input voltage Vin rapidly during the suspension. Overshoot is caused by the inability of the regulator 20 to catch up with a rapid change in the output voltage Vout. The novel auxiliary circuit for forcibly lowering the input voltage Vin and the novel auxiliary circuit for forcibly lowering the output voltage Vout are respectively capable of changing the input voltage Vin and the output voltage Vout more rapidly than the regulator 20. As a result, overshoot that may affect the reliability of the device connected as the load circuit 18 is prevented and it is ensured that the output voltage Vout converges to the preset voltage Vset in a short period of time.

The present invention addresses both types of overshoot occurring at normal start-up of the booster circuit and occurring when the load is switched, by providing similar effects through a similar process. For prevention of overshoot occurring at start-up, the present invention may be used in combination with an ordinary soft start means.

The embodiment is only illustrative in nature and it will be obvious to those skilled in the art that variations in constituting elements and processes are possible within the scope of the present invention.

In this embodiment, a description was given of the structure, workings and effects of the power supply apparatus in which the gain is switched between 1.0 and 2.0. The essential structure, workings and effects of the present invention remain unchanged with the booster circuit 10 capable of switching between a large number of gain values including, for example, 1.0, 1.5 and 2.0. In this case, the charge pump circuit 30 itself would be provided with two or more gain values including, for example, 1.5 and 2.0. When the gain of 1.0 is designated, the boosting operation of the charge pump circuit 30 may be suspended and the bypass switch SW4 may provided a path to bypass the charge pump circuit 30. When the gain of 1.5 or 2.0 is designated, the second control signal S2 may control the switching operation inside the charge pump circuit 30 so that the desired gain is obtained.

More specifically, switching the gain between 1.5 and 2.0 in the charge pump circuit 30 is achieved by, for example, providing two charge capacitors of equal capacitance in the charge pump circuit 30. When the gain of 1.5 is designated, the two change capacitors are connected in series and charged by the input voltage Vin. As a result, a voltage equal to 0.5×Vin is charged in each of the charge capacitors. By then switching the two charge capacitors into parallel connection and connecting the ground terminals of the capacitors to the input voltage Vin, the output voltage Vout=0.5×Vin+Vin=1.5×Vin is obtained at the other end of the parallel connection of the capacitors, thereby achieving the gain of 1.5.

When the gain of 2.0 is designated, the two charge capacitors are connected in parallel and are charged by the input voltage Vin. This will charge the capacitors by the voltage Vin. By subsequently switching the ground terminals of the capacitors into connection with the input voltage Vin while maintaining the parallel connection, the output voltage Vout=Vin+Vin=2×Vin is obtained at the other end of the parallel connection of the capacitors, thereby achieving the gain of 2.0. The switching operations as described above may be controlled in accordance with the second control signal S2 output from the control circuit 32 and may be used in combination with the operation of the bypass switch SW4. With this, switching between a plurality of gain values including, for example, 1.0, 1.5 and 2.0, is achieved as desired.

Conversely, the booster circuit 10 may not be provided with the gain switching function and operate at a fixed gain. In this case, the function for suppressing overshoot operates effectively at start-up of the booster circuit 10 or when the load connected changes.

In the described embodiment, the forced drop of the input voltage by the first switch SW1, the suspension of operation of the booster circuit 10, the forced drop of the output voltage by the second switch SW2, the cut off of current by the third switch SW3 are all used in combination with each other. It will be noted that not all of the elements are necessary to achieve similar effects.

In this invention, it is favorable that a time (hereinafter, referred to as time Ta) that elapses, while the boost suspension signal DIS remains high, since the output voltage Vout starts to drop until it reaches the threshold voltage Vth be designed to be equal to a time (referred to as time Tb) that elapses, while the boost suspension signal DIS remains high, since the input voltage Vin starts to drop until it reaches a level 1/gain of the preset voltage Vset set up for the output voltage. Accordingly, various modes of practicing the invention are conceivable as long as the condition is observed in which the capacitance of the input and output capacitors C1 and C2, the speed of discharge of the output capacitor C2 and the speed of discharge of the input capacitor C1 are regulated appropriately. Regulation of the speed of discharge is achieved by modifying the size of transistor used in the switch and by inserting a resistor in series with the switch.

As long as the condition Ta=Tb is established by employing these measures for regulating the speed of discharge, the operation of the auxiliary circuit upon detection of overshoot may involve only the first switch SW1 and the suspension of the boosting operation. In this case, the output voltage Vout is lowered by the load circuit 18 and the forced drop of the input voltage Vin is achieved by the first switch SW1.

Various other modes of regulation are possible, including, for example, the combined use of the suspension of boosting operation by the booster circuit 10, the first switch SW1 and the second switch SW2, as well as the combined use of the suspension of boosting operation by the booster circuit 10, the first switch SW1 and the third switch SW3, etc.

By involving a plurality of measures, overshoot can be prevented efficiently and subsequent convergence to the preset voltage can be achieved in a short period of time. The purpose of preventing overshoot or the purpose of reducing a period of time required for stabilization of output is achieved by employing only one measure. For example, when only the suspension of the boosting operation is performed, the effects are such that the output voltage Vout is prevented from excessively increasing beyond the threshold voltage Vth. When only the forced drop of the output voltage Vout is performed, the effects are such that voltage rise in overshoot is slowed down. When only the forced drop of the input voltage Vin is performed, the output voltage Vout is established in a short period of time. When only the means of suspending the supply of current from the regulator 20 is used, its function is equivalent to that of the suspension of boosting operation since the current is prevented from being supplied to the booster circuit 10. With this, it is expected that the duration of overshoot is shortened.

In the described embodiment, an example is shown in which the third switch SW3 is used as a means to suspend the supply of current from the regulator 20 to the booster circuit 10. Alternatively, similar effects may be achieved by providing an input terminal for receiving the boost suspension signal DIS in the operational amplifier 12 so that, when the boost suspension signal DIS goes high, the voltage supplied to the gate of the MOSFET 14 is increased to the battery voltage Vbat.

In an alternative embodiment, the power supply apparatus 100 may be provided with an auxiliary circuit as a means of preventing overshoot, wherein the auxiliary circuit is capable of changing the input voltage Vin at a response speed faster than the rate at which the input voltage Vin is regulated by the regulator 20. Overshoot occurring in a normal situation is caused by the inability of the regulator 20 to catch up with abrupt change of the output voltage Vout. In this alternative embodiment, an auxiliary circuit, which operates at a higher speed than the regulator 20 but is not designed to regulate at any preset values unlike the regulator 20, and which operates on an on or off basis, is provided in parallel with the regulator 20 as an emergency provision. By providing, for a group of threshold values, a single or a plurality of auxiliary circuits that accelerates convergence to the preset voltage Vset, overshoot is more successfully prevented and convergence to the preset voltage Vset is achieved in a shorter period of time.

What is claimed is:

1. A power supply apparatus comprising:
    a linear regulator which receives an input voltage and outputs a regulated voltage;
    a charge pump type booster circuit which boosts the regulated voltage at a preset gain and outputs a boosted output voltage;
    a voltage comparator which compares the boosted output voltage with a predetermined threshold voltage and outputs a boost suspension signal when the boosted output voltage is higher than the threshold voltage;
    a first auxiliary circuit which forcibly lowers the regulated voltage input to the booster circuit in response to the boost suspension signal,
    a second auxiliary circuit which forcibly lowers the boosted output voltage of the charge pump type booster circuit in response to the boost suspension signal;
    a current limiter circuit which limits the supply of current from the linear regulator to the charge pump type booster circuit in response to the boost suspension signal; and
    means which suspends a boosting operation of the charge pump type booster circuit in response to the boost suspension signal, wherein
    the linear regulator receives the boosted output voltages from the charge pump type booster circuit and generates the regulated voltage by feedback so that the boosted output voltage is equal to a preset voltage and wherein
    the first auxiliary circuit, the second auxiliary circuit, the current limiter circuit and the means which suspends the boosting operation are controlled based on the boost suspension signal from the voltage comparator.

2. The power supply apparatus according to claim 1, wherein the first auxiliary circuit comprises a first switch element which is provided between an input terminal of the charge pump type booster circuit and the ground and which is turned on by the boost suspension signal, wherein
    the second auxiliary circuit comprises a second switch element which is provided between an output terminal of the charge pump type booster circuit and the ground and which is turned on in response to the boost suspension signal, and
    the linear regulator comprises:
        an error amplifier which amplifiers an error between the boosted output voltage of the charge pump type booster circuit and the preset voltage; and
        a transistor having its conduction level controlled by an output from the error amplifier, and wherein
        the current limiter circuit comprises a switch element provided between a control terminal of the transistor and a fixed voltage.

3. The power supply apparatus according to claim 2, wherein
    the first switch element, the second switch element, and the third switch element of the current limiter circuit are controlled to be turned off according to the boost suspension signal from the voltage comparator.

4. A power supply apparatus according to claim 1, further comprising:
    a fast response auxiliary circuit which is provided in parallel with the regulator and regulates the input voltage at a response speed higher than the regulation of the input voltage by the linear regulator, wherein
    the linear regulator receives the boosted output voltage from the charge pump type booster circuit and generates the regulated voltage by feedback so that the boosted output voltage is equal to a preset voltage.

5. An electronic appliance comprising:
    a light-emitting element; and
    the power supply apparatus according to claim 1 which supplies a voltage to drive the light-emitting element.

6. An electronic appliance comprising:
    a light-emitting element; and
    the power supply apparatus according to claim 2 which supplies a voltage to drive the light-emitting element.

7. An electronic appliance comprising:
    a light-emitting element; and
    the power supply apparatus according to claim 4 which supplies a voltage to drive the light-emitting element.

8. An electronic appliance comprising:
    a light-emitting element; and
    the power supply apparatus according to claim 3 which supplies a voltage to drive the light-emitting element.

* * * * *